March 31, 1964  J. M. DUNSTON  3,127,150
DEVICE FOR INSERTING GROUND ANCHOR
Filed Sept. 22, 1961
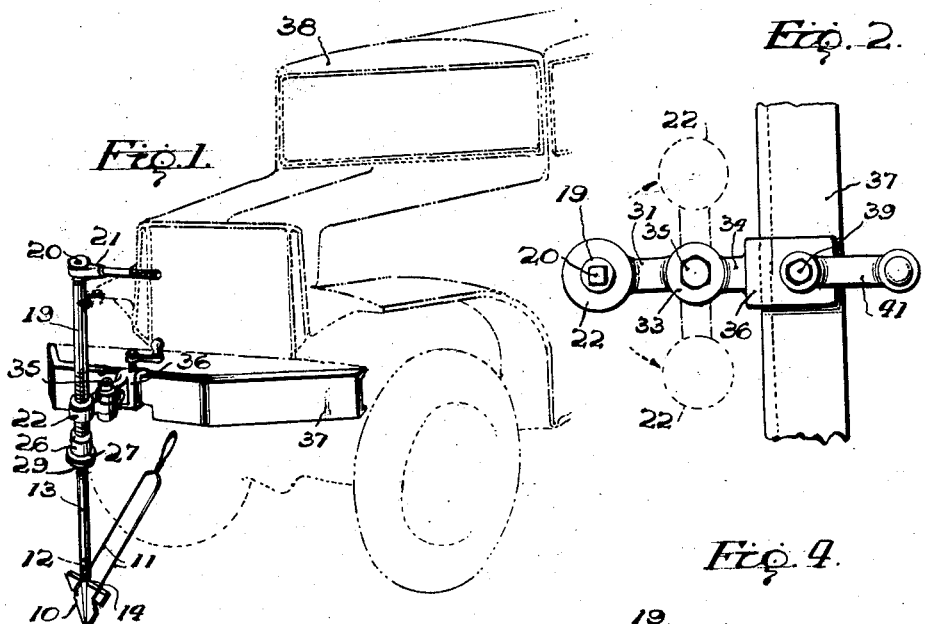
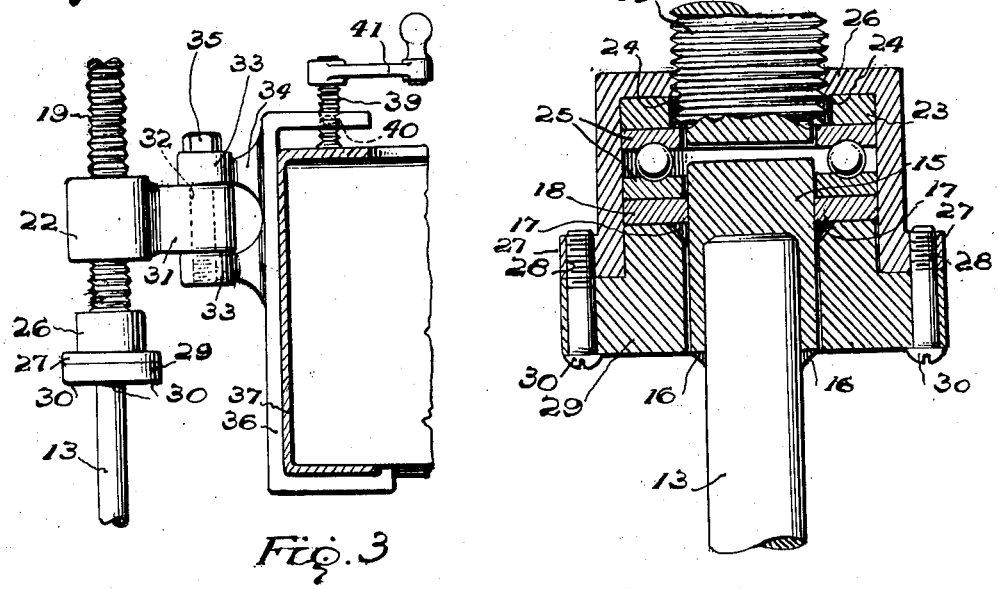
INVENTOR
James M. Dunston

United States Patent Office 3,127,150
Patented Mar. 31, 1964

3,127,150
DEVICE FOR INSERTING GROUND ANCHOR
James M. Dunston, Natick, Mass., assignor to the United States of America as represented by the Secretary of the Army
Filed Sept. 22, 1961, Ser. No. 140,145
5 Claims. (Cl. 254—98)
(Granted under Title 35, U.S. Code (1952), sec. 266)

The invention described herein, if patented, may be manufactured and used by or for the Government for governmental purposes, without the payment to me of any royalty thereon.

My invention relates to a device for inserting a ground anchor in the earth.

Heretofore it has been the practice to insert arrowhead type ground anchors to provide suitable hold downs for tents and the like by utilizing a drive rod and a sledge hammer. This method has been unsatisfactory because of the physical exertion necessary to insert the anchor to the correct depth (24" to 30") and the length of time required.

It is therefore an object of my invention to provide a device for inserting ground anchors in the earth which will require a minimum amount of time and physical effort.

Another object of my invention is to provide a device for inserting ground anchors which utilizes the weight of a vehicle to force the anchor into the ground.

An additional object of my invention is to provide a device for inserting ground anchors utilizing a drive screw and a nonrotating drive rod.

A further object of my invention is to furnish a device for inserting ground anchors which after inserting the anchor and the drive rod in the earth can retrieve the drive rod.

Other objects and advantages of my invention will be apparent during the course of the following description.

In the accompanying drawing forming a part of this application, and in which like numerals are employed to designate like parts throughout the same:

FIGURE 1 is a perspective view of my invention attached to the bumper of a vehicle;

FIGURE 2 is a top plan view of my invention omitting the ratchet wrench and showing adjustments to accurately locate the anchor in the desired position;

FIGURE 3 is a fragmentary side elevational view of my invention; and

FIGURE 4 is a cross-sectional view of the thrust bearing assembly.

In the drawing wherein for the purposes of illustration is shown a preferred embodiment of my invention, the numeral 10 indicates an arrowhead type ground anchor carrying ground anchor guy wire 11 and having a pin 12 protruding from its upper surface.

A drive rod 13 is detachably secured to the anchor 10 by means of a socket 14 which receives the pin 12. A cap 15 (see FIG. 4) is seated on the upper portion of the drive rod 13 and is secured thereto in any suitable manner such as by welding indicated at 16. Secured inwardly, as by welding 17, from the upper portion of the cap 15 is a collar 18.

The numeral 19 indicates a threaded drive screw terminating at one end in a square head 20 to fit a reversible type ratchet wrench 21. The drive screw 19 is threaded through a sleeve or hub 22. A collar 23 is secured to the drive screw 19 inwardly of its lower end by any suitable means such as by welding indicated at 24.

A bearing 25 is disposed between the collars 18 and 23 to form a thrust bearing. The thrust bearing housing 26 is carried by the drive screw 19 and has a bottom flange 27 provided with a plurality of threaded openings 28 on its underside. The thrust bearing is completely enclosed by the addition of the housing cap 29 which is secured to the housing 26 by means of screws 30 which are threaded into the openings 28.

As best seen in FIGURE 3, the sleeve or hub 22 has an arm 31 having a vertical opening 32 extending through its outer portion. The arm 31 is fastened for horizontal movement between the ears 33 of the bracket 34 by a bolt 35. The bracket 34 is an integral part of the clamp 36 which is secured to a bumper 37 of a vehicle 38 by means of a clamping screw 39 which extends through an opening 40 in top portion of the clamp 36. A handle 41 is provided to operate the screw 39.

To assemble the device the thrust bearing housing 26 and the sleeve or hub 22 are threaded on the drive screw 19. The reversible type ratchet wrench 21 is then placed over the head 20 of the drive screw 19. The bearing 25 is seated in the housing 26 bearing against the collars 18 and 23 and is held in position by the housing cap 29 and its screws 30 which slides over the lower end of the drive rod 13. The ground anchor inserting device having been assembled, it is now secured to the bumper 37 of a vehicle 38 by means of a swivel joint, formed by the arm 32 of the sleeve 22 and the ears 33 of the bracket 34, and the clamp 36.

In operation, after the anchor 10 is positioned upright with the pin 12 seated in the socket 14 of the drive rod 13, and the device is located in the desired position by moving same horizontally by means of the swivel joint, the ratchet wrench 21 is turned to drive the drive screw 19 earthward. The collar 23 of the drive screw 19 is turned against the bearing 25. This in turn forces the collar 18, the drive rod 13 and the anchor 10 downward without rotating same. It will be appreciated that the driving screw 19 being connected to the vehicle 38 as heretofore described utilizes the weight of the vehicle to push against the resistance of the anchor 10 as it is being inserted. In this manner a minimum of time and energy are expended.

After the anchor 10 has been inserted the desired depth (24" to 30"), the drive rod 13 is retrieved by reversing the ratchet wrench 21 and turning the drive screw 19 in the opposite direction.

It is to be understood that the form of the invention herewith shown and described is to be taken as a preferred embodiment of same, and that various changes in the shape, size, and arrangement of parts may be resorted to without departing from the spirit of my invention or the scope of the subjoined claims.

I claim:

1. In a device for inserting a ground anchor in the earth comprising a drive rod adapted at its lower end to engage an anchor, a collar provided on said drive rod at the upper end thereof and integral therewith, a sleeve having an interior thread, a drive screw threaded through said sleeve, a second collar carried by said drive screw at the lower end thereof and integral therewith, a bearing disposed between said first and second mentioned collars, a housing enclosing said bearing and said first and second mentioned collars, supporting means secured to said sleeve holding said device upright, and reversible drive means turning said drive screw in one direction to insert said drive rod and anchor in the ground and in an opposite direction to withdraw said drive rod from the ground after the anchor has been positioned.

2. In a device for inserting a ground anchor in the earth adapted to be detachably secured to a four-wheeled vehicle, the combination with a vehicle having a bumper; of an anchor inserting device comprising a drive rod adapted at its lower end to engage said anchor, a thrust bearing secured to said drive rod at the upper end thereof, a sleeve having an interior thread, an arm carried by said sleeve, a drive screw having its lower end threaded through said sleeve and engaging said thrust bearing, reversible drive means turning said screw in one direction to insert the anchor and the drive rod and in an opposite direction to withdraw the drive rod after the anchor has been positioned, and securing means detachably fastening said arm to the bumper of said vehicle whereby said anchor is forced into the ground against the weight of the vehicle when the screw is turned.

3. The structure of claim 2, wherein said arm is pivotally secured to the bumper for horizontal movement relative thereto.

4. In a device for inserting a ground anchor in the earth adapted to be detachably secured to a four-wheeled vehicle, the combination with a vehicle having a bumper; of an anchor inserting device comprising a drive rod adapted at its lower end to engage said anchor, a collar provided on said drive rod at the upper end thereof and integral therewith, a sleeve having an interior thread, a drive screw threaded through said sleeve, a second collar carried by said drive screw at the lower end thereof and integral therewith, a bearing disposed between said first and second mentioned collars, a housing enclosing said bearing and said collars, securing means detachably fastening said sleeve to the bumper of said vehicle whereby said anchor is forced into the ground against the weight of the vehicle when the drive screw is turned, and reversible drive means turning said drive screw in one direction to insert said drive rod and anchor in the ground and in an opposite direction to withdraw said drive rod from the ground after the anchor has been positioned.

5. In a device for inserting a ground anchor in the earth adapted to be detachably secured to a four-wheeled vehicle, the combination with a vehicle having a bumper; of an anchor inserting device comprising a drive rod adapted at its lower end to engage said anchor, a collar provided on said drive rod at the upper end thereof and integral therewith, a sleeve having an interior thread, an arm carried by said sleeve, a drive screw threaded through said sleeve, a second collar carried by said drive screw at the lower end thereof and integral therewith, a bearing disposed between said first and second mentioned collars, a housing enclosing said bearing and said collars, a bracket having outwardly spaced ears detachably secured to said vehicle, said arm mounted between said ears for horizontal movement relative to the ground, and reversible drive means turning said screw in one direction to force said anchor and said drive rod into the ground against the weight of the vehicle and in an opposite direction to withdraw said drive rod from the ground after the anchor has been positioned.

References Cited in the file of this patent

UNITED STATES PATENTS

| | | |
|---|---|---|
| 309,769 | Crucial | Dec. 23, 1884 |
| 577,167 | Maybach | Feb. 16, 1897 |
| 1,047,097 | MacNab | Dec. 10, 1912 |
| 1,451,852 | Verdoorn | Apr. 17, 1923 |
| 2,736,954 | Palmer | Mar. 6, 1956 |
| 2,742,258 | Rosasco | Apr. 17, 1956 |
| 3,073,571 | Wunsch | Jan. 15, 1963 |